US012721491B2

(12) United States Patent
Xiong

(10) Patent No.: US 12,721,491 B2
(45) Date of Patent: Sep. 1, 2026

(54) ACTIVE OBSTACLE CROSSING CONTROL METHOD AND SYSTEM FOR CLEANING ROBOT, AND CLEANING ROBOT

(71) Applicant: Dreame Innovation Technology (Suzhou) Co., Ltd., Suzhou (CN)

(72) Inventor: Chenggang Xiong, Suzhou (CN)

(73) Assignee: Dreame Innovation Technology (Suzhou) Co., Ltd., Suzhou (CN)

( * ) Notice: Subject to any disclaimer, the term of this patent is extended or adjusted under 35 U.S.C. 154(b) by 37 days.

(21) Appl. No.: 18/668,734

(22) Filed: May 20, 2024

(65) Prior Publication Data

US 2025/0302263 A1 Oct. 2, 2025

(30) Foreign Application Priority Data

Apr. 2, 2024 (CN) ........................ 202410389379.3

(51) Int. Cl.
*A47L 11/40* (2006.01)
*A47L 11/24* (2006.01)
(Continued)

(52) U.S. Cl.
CPC ........... *A47L 11/4011* (2013.01); *A47L 11/24* (2013.01); *A47L 11/4002* (2013.01);
(Continued)

(58) Field of Classification Search
CPC .. A47L 11/4011; A47L 11/24; A47L 11/4002; A47L 11/4061; A47L 11/4063;
(Continued)

(56) References Cited

U.S. PATENT DOCUMENTS

2003/0060928 A1 3/2003 Abramson et al.
2003/0120389 A1 * 6/2003 Abramson .............. F04D 29/30 318/568.12

(Continued)

FOREIGN PATENT DOCUMENTS

CN 106896814 A 6/2017
CN 107791232 A 3/2018

(Continued)

OTHER PUBLICATIONS

Machine Translation of CN-209030338-U (Year: 2019).*

(Continued)

*Primary Examiner* — Brandon D Lee
(74) *Attorney, Agent, or Firm* — Nathan & Associates Patent Agents Ltd.; Menachem Nathan

(57) ABSTRACT

The present disclosure relates to an active obstacle crossing control method and system for cleaning robot, and a cleaning robot, the cleaning robot comprises an active obstacle crossing mechanism and an obstacle crossing driving device that drives the motion of the active obstacle crossing mechanism, the method comprises in case where an obstacle is on the cleaning path, identifying the height of the obstacle and the material type of the contact surface before the cleaning robot crosses the obstacle; in case where the height of the obstacles matches a predefined obstacle crossing height range corresponding to the material type, activating the active obstacle crossing function.

17 Claims, 2 Drawing Sheets

(51) Int. Cl.

| | |
|---|---|
| ***G05D 1/639*** | (2024.01) |
| ***G05D 1/689*** | (2024.01) |
| ***G05D 105/10*** | (2024.01) |
| ***G05D 107/40*** | (2024.01) |

(52) U.S. Cl.

CPC ....... *A47L 11/4061* (2013.01); *A47L 11/4063* (2013.01); *G05D 1/639* (2024.01); *G05D 1/689* (2024.01); *A47L 2201/04* (2013.01); *A47L 2201/06* (2013.01); *G05D 2105/10* (2024.01); *G05D 2107/40* (2024.01)

(58) Field of Classification Search

CPC .. A47L 2201/04; A47L 2201/06; A47L 9/009; A47L 11/4066; A47L 2201/00; G05D 1/639; G05D 1/689; G05D 2105/10; G05D 2107/40; G05D 2111/10; G05D 2111/17; G05D 2111/64; G05D 1/242; G05D 1/243; G05D 2109/10

See application file for complete search history.

(56) References Cited

U.S. PATENT DOCUMENTS

| | | | | |
|---|---|---|---|---|
| 2018/0289231 | A1 | 10/2018 | Santini | |
| 2019/0015982 | A1 | 1/2019 | Kou et al. | |
| 2020/0022551 | A1* | 1/2020 | Watanabe | A47L 11/4011 |
| 2020/0089249 | A1 | 3/2020 | Furuta | |
| 2022/0125255 | A1 | 4/2022 | Choi et al. | |
| 2023/0135649 | A1* | 5/2023 | Strang | A47L 11/065 134/18 |
| 2024/0069566 | A1* | 2/2024 | Kim | G05D 1/243 |
| 2025/0089966 | A1* | 3/2025 | Wang | A47L 11/282 |

FOREIGN PATENT DOCUMENTS

| | | | |
|---|---|---|---|
| CN | 209030338 | U * | 6/2019 |
| CN | 111728534 | A | 10/2020 |
| CN | 112155486 | A | 1/2021 |
| CN | 114434495 | A | 5/2022 |
| CN | 114451814 | A | 5/2022 |
| CN | 114468894 | A | 5/2022 |
| CN | 114594482 | A | 6/2022 |
| CN | 114617463 | A | 6/2022 |
| CN | 115565058 | A | 1/2023 |
| CN | 116540688 | A | 8/2023 |
| CN | 116802583 | A | 9/2023 |
| CN | 117462044 | A | 1/2024 |
| EP | 3900604 | A1 | 2/2024 |
| JP | 2020068897 | A | 5/2020 |
| KR | 20130021212 | A | 3/2013 |
| WO | 2021120999 | A1 | 6/2021 |

OTHER PUBLICATIONS

Chinese Notice of Allowance issued in corresponding Chinese Patent Application No. 202410389379.3 dated May 22, 2024.
Examination report AU application 2024203279 , dated Feb. 10, 2025.
Extended European search report EP application 24176667.4, Dated Feb. 5, 2025.
Wikipedia article XP93241567A I—Stereo Camera, Sep. 12, 2023.
Chinese First office action of Chinese application No. 202410389379.3, mailed on May 8, 2024.
ESR in related EP patent application 24176667.4 dated Nov. 4, 2024.
Korean Office Action issued in corresponding Korean Patent Application No. 10-2024-0091371 dated Jan. 21, 2026, pp. 1-5.
European Office Action issued in corresponding European Patent Application No. 24176667.4 dated Feb. 5, 2026, pp. 1-9.
Singapore Search Report issued in corresponding Singapore Patent Application No. 10202401444T dated Apr. 9, 2026, pp. 1-10.

* cited by examiner

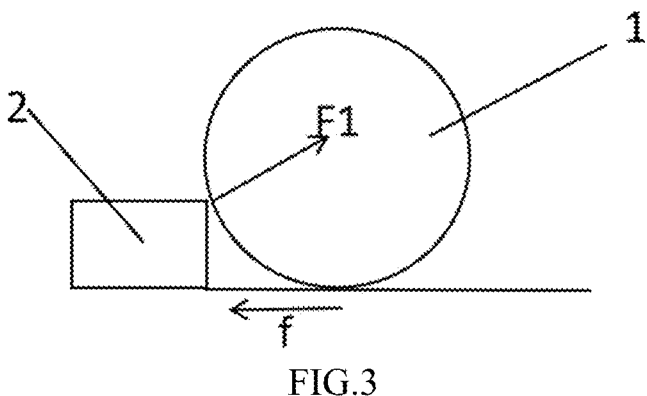
FIG.3
control system 400
identification module 401
control module 402
FIG.4
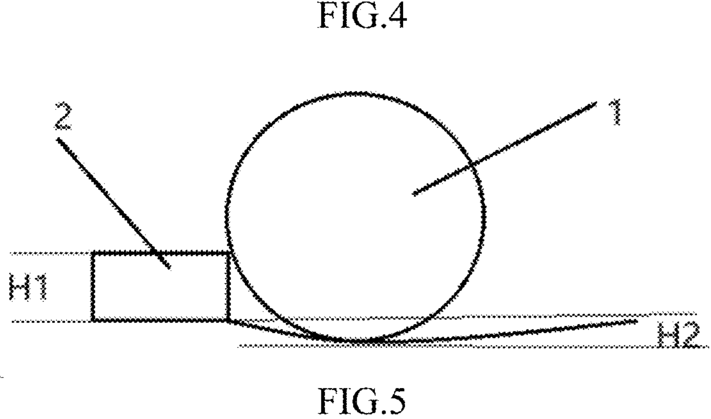
FIG.5

ACTIVE OBSTACLE CROSSING CONTROL METHOD AND SYSTEM FOR CLEANING ROBOT, AND CLEANING ROBOT

CROSS-REFERENCE TO RELATED APPLICATIONS

This application claims the benefit of China Patent Application No. 202410389379.3, filed with the China National Intellectual Property Administration on Apr. 2, 2024 and entitled "ACTIVE OBSTACLE CROSSING CONTROL METHOD AND SYSTEM FOR CLEANING ROBOT, AND CLEANING ROBOT", the disclosures of which are incorporated by reference herein in their entirety.

TECHNICAL FIELD

The present disclosure relates to the technical field of self-moving robots walking, and more specifically, to an active obstacle crossing control method and system for cleaning robot, and cleaning robot.

BACKGROUND

Cleaning robots may encounter some obstacles along the cleaning path during the autonomous cleaning process. Generally, the cleaning robot which do not have active obstacle crossing ability attempts to overcome obstacles through direct collisions. The cleaning robot may overcome obstacles below a certain height through the combined effect of the friction between the cleaning robot and the ground, as well as the compression between the cleaning robot and the obstacles.

If the height of the obstacle is lower than the predefined height, the cleaning robot can directly cross the obstacle. For target obstacles with a height higher than the predefined height, self-moving robots have developed active obstacle crossing components targetedly, the active obstacle crossing components can be activated at the obstacle, and lift the sweeping robot, thereby the obstacle crossing ability of the sweeping robot can be improved and the sweeping robot can cross the target obstacle.

Some cleaning robots are equipped with active obstacle crossing mechanisms, the height and posture of the robot can be changed by controlling the changes in the active obstacle crossing mechanism, thereby improving the obstacle crossing ability. However, there is no good active obstacle crossing judgment function in existing technologies, relying solely on obstacle height information to control the activation of active obstacle crossing will result in too many unnecessary active obstacle crossing controls, or even after the active obstacle crossing function is activated, it will still be unable to smoothly overcome obstacles, this not only wastes the energy of the cleaning robot, but also causes damage to the active obstacle crossing mechanism. Therefore, a more optimized control method is needed to improve the efficiency and lifespan of cleaning robots.

SUMMARY

In view of this, the present disclosure provides an active obstacle crossing control method and system for cleaning robot, and cleaning robot, the cleaning robot of the present disclosure is capable of more accurately determining whether obstacle crossing is necessary by combining analysis of obstacle information and contact surface information when encountering obstacles, thereby the success rate of obstacle crossing can be improved and the loss of product mechanism can be reduced.

On one side, the present disclosure provides an active obstacle crossing control method for cleaning robot, the cleaning robot comprises an active obstacle crossing mechanism and an obstacle crossing driving device that drives the motion of the active obstacle crossing mechanism, the method comprises: in case where an obstacle is on the cleaning path, identifying the height of the obstacle and the material type of the contact surface before the cleaning robot crosses the obstacle;

in case where the height of the obstacles matches a predefined obstacle crossing height range corresponding to the material type, activating the active obstacle crossing function. This present disclosure is able to perform a pre-rating and estimation of the friction force provided by the contact surface to the sweeping robot based on the detected material type of the contact surface, this allows for the prediction of whether the sweeper can cross the obstacle at the current height through its own mobility abilities based on other predefined empirical parameters. If the sweeper cannot cross the obstacle, the present disclosure activates the active obstacle crossing function to minimize unnecessary active obstacle crossing control, prevent wastage of the sweeper's energy, and reduce damage to the active obstacle crossing mechanism.

In some embodiments, the material type is obtained through real-time detection by the cleaning robot during operation. The present disclosure can obtain ground materials by utilizing a sweeping robot with its own ground material recognition function. The present disclosure obtains the material type of the contact surface corresponding to the wheels during the cleaning robot's obstacle crossing process by real-time detection of the ground material in case where an obstacle is on the cleaning path. Thereby this enables the efficient obstacle crossing effect, and can save costs and effectively share data by combining the existing functionalities with the control logic of the present disclosure.

In some preferred embodiments, the material type is obtained through activating the contact surface material detection function and detecting the corresponding contact surface when crossing the obstacle by the cleaning robot in case where an obstacle is on the cleaning path. The robot can obtain the material type through detecting the corresponding contact surface when crossing the obstacle, when there is no contact during normal operation, the material detection function is not activated. Therefore, the sweeping robot will automatically recognize the obstacles and activate the material detection function to distinguish different material types when encounters obstacles. This approach helps to improve the cleaning efficiency and effectiveness of the sweeping robot, saving energy compared to real-time detection, and enabling them to better cope with cleaning tasks in various complex environments.

Wherein further preferably, the material type are one or more of carpet, wood, ceramic tiles, marble, rubber roll, or epoxy resin, the present disclosure has considered multiple scenarios of household cleaning, the application takes into account the variations in the friction force range provided by the contact surface due to different material types. Therefore, depending on the material type, it is possible to select different ranges of that require the activation of the active obstacle crossing function.

In one embodiment, the material type reflects the friction force between the wheel and the ground material, this present disclosure is able to perform a pre-rating and estimation of the friction force provided by the contact surface to the sweeping robot based on the detected material type of the contact surface, this allows for the prediction of whether the sweeper can cross the obstacle at the current height through its own mobility abilities based on other predefined empirical parameters.

In another preferred embodiment, the material type reflects the compression degree between the wheel and the ground material, this present disclosure makes the cleaning robot fully consider the different sinkage caused by different materials of the ground before actively crossing obstacles, therefore, the actual obstacle crossing height considered by the cleaning robot should be the height at which the obstacle exceeds the ground plus the sinking height of the robot, this allows for a more precise determination of the actual obstacle crossing height and enables the cleaning robot to make decisions based on the specific circumstances whether to activate the active obstacle crossing or choose to avoid them.

The predefined obstacle crossing height corresponding to the material type, is a pre-stored mapping relationship, the judgment method of the controller can be simplified to make faster and more direct effective judgments, thereby quickly determining whether to activate the active obstacle crossing function.

Further preferably, the predefined height range comprises the minimum height and the maximum height, when the height of the obstacle is higher than the minimum height but lower than the maximum height, activating the active obstacle crossing function. When the detected obstacle height is lower than the minimum height, the sweeper directly passes through the obstacle, however, when the detected obstacle height is higher than the maximum height, the active obstacle crossing function is not activated, and the cleaning robot is directed to circumvent the obstacle, this control method is simple and effective with predefined obstacle height ranges corresponding to different materials, these ranges can be adjusted based on factors such as the weight of the sweepin robot and the height of its wheels.

The active obstacle crossing function will not be activated when the height of the obstacle does not match the predefined obstacle crossing height range corresponding to the material type, thereby this helps to minimize unnecessary active obstacle crossing control, prevent wastage of the sweeper's energy, and reduce damage to the active obstacle crossing mechanism.

In addition, the present disclosure further provides a control system for cleaning robot, the cleaning robot comprises an active obstacle crossing mechanism and an obstacle crossing driving device that drives the motion of the active obstacle crossing mechanism.

The control system comprises an identification module, the identification module is configured to identify the height of the obstacle and the material type of the contact surface before the cleaning robot crosses the obstacle in case where an obstacle is on the cleaning path;

a control module, the control module is configured to activate the active obstacle crossing function in case where the height of the obstacles matches a predefined obstacle crossing height range corresponding to the material type. The control system can be applied in the sweeping robot and activate the active obstacle crossing function in case where the height of the obstacles matches a predefined obstacle crossing height range corresponding to the material type. This present disclosure is able to perform a pre-rating and estimation of the friction force provided by the contact surface to the sweeping robot based on the detected material type of the contact surface, this allows for the prediction of whether the sweeper can cross the obstacle at the current height through its own mobility abilities based on other predefined empirical parameters. If the sweeper cannot cross the obstacle, the present disclosure activates the active obstacle crossing function to minimize unnecessary active obstacle crossing control, prevent wastage of the sweeper's energy, and reduce damage to the active obstacle crossing mechanism.

On another side, the present disclosure further provides a computer-readable storage medium, a program is stored in the computer-readable storage medium, when the program is executed by the processor, the processor is configured to implement the control method above. The storage medium is installed in the sweeping robot and can control the robot through the aforementioned logic, thus achieving the technical effect of effective active obstacle crossing.

On another side, the present disclosure further provides a cleaning robot, comprises an active obstacle crossing mechanism, an obstacle crossing driving device that drives the motion of the active obstacle crossing mechanism, a memory and a processor, wherein a program is stored in the memory, the processor is configured to execute the control method above.

Further preferably, the active obstacle crossing mechanism is a connecting rod mechanism, a cam mechanism, or a piston lifting mechanism.

Further preferably, the obstacle crossing driving device is a motor system used for the motion of the active obstacle crossing mechanism.

Further preferably, the active obstacle crossing mechanism and driving wheels are sequentially set before and after in the movement direction of the cleaning robot, the minimum distance between the contact point of the active obstacle crossing mechanism to the ground during the active obstacle crossing and the contact point of the driving wheels to the ground is 3 cm to 5 cm. This allows the cleaning robot to be lifted in the form of a lever.

BRIEF DESCRIPTION OF THE DRAWINGS

The drawings are included in the specification and form part of it, these drawings, together with the specification, present exemplary embodiments, features, and aspects of the present application, and are used to explain the principles of the present application.

FIG. 3 is a contact diagram between the wheel of the cleaning robot and an obstacle in an embodiment of the present application;

FIG. 4 is a schematic diagram of the control system for cleaning robot in an embodiment of the present application;

FIG. 5 is a contact diagram between the wheel of the cleaning robot and an obstacle in another embodiment of the present application.

DETAILED WAYS

Figure 1:
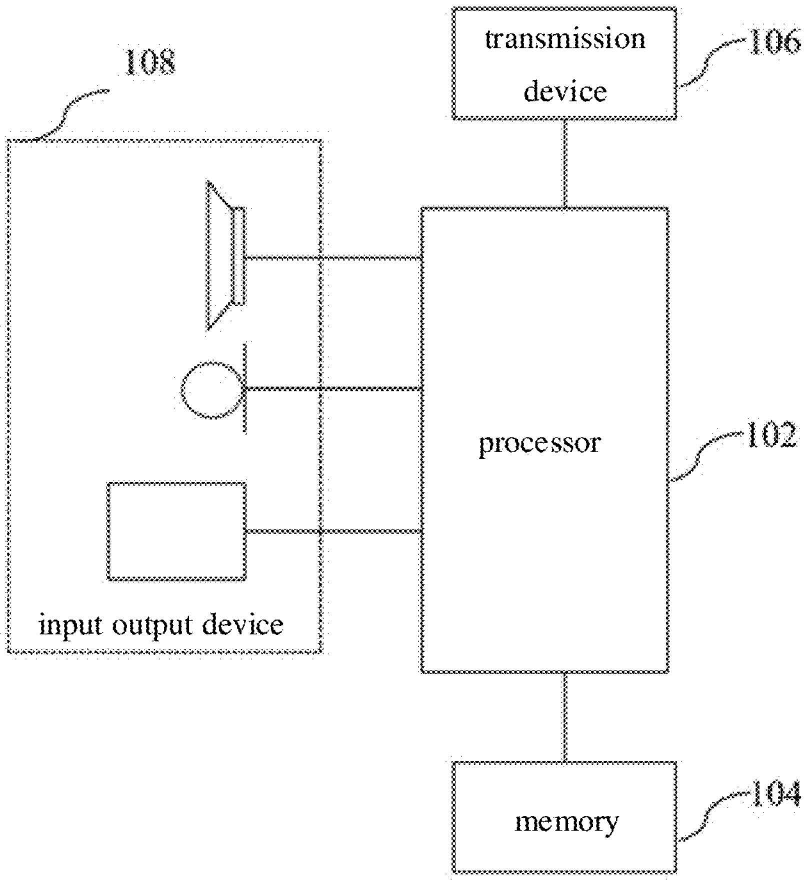
FIG. 1 is a schematic diagram of the structure of a computer terminal in an embodiment of the present application.

The various exemplary embodiments, features, and aspects of the present application will be detailed with reference to the accompanying drawings in the following.

The same symbols in the drawings indicate components with the same or similar functions. Although various aspects of the embodiment are shown in the drawings, it is not necessary to draw the drawings to scale unless specifically indicated.

The term "exemplary" here means "provided as an example, embodiment, or illustrative". Any embodiments described here as "exemplary" are not intended to imply superiority or preference over other embodiments.

The same or similar labels in the drawings of this embodiment correspond to the same or similar components; it should be understood in the description of the present invention that terms such as "up", "down", "left", "right", "inside", and "outside", indicating the orientation or positional relationships are based on the orientations or positional relationships shown in the drawings, solely for the purpose of facilitating the description and simplifying the description, the terms do not indicate or imply that the device or component being referred to must have a specific orientation, be constructed or operated in a specific orientation, therefore, the terms describing the positional relationships in the drawings is exemplary and should not be interpreted as limiting the scope of this patent, those skilled in the art will understand the specific meanings of the above terms based on the specific circumstances.

It should be noted that in this document, the terms "include", "comprise", or any other variations thereof, are intended to encompass a non-exclusive inclusion, this means that a process, item, or device comprising a series of elements includes not only those elements explicitly listed but also additional elements that are not explicitly listed, or also includes inherent elements of the process, item, or device. Without further limitations, the statement "including one . . . " limits the element, but it does not exclude the existence of another identical element in the process, item, or device that includes that element.

It should be noted that the terms "first", "second", and so on, used in the specification, claims, and the aforementioned drawings, are used to distinguish similar objects and are not intended to describe a specific sequence or order.

In addition, in order to better illustrate the present application, numerous specific details are provided in the following embodiments. Those skilled in the art should understand that this application can also be implemented without certain specific details. In some embodiments, in order to highlight the essence of the present application, known methods, means, components, and circuits by those skilled in the art are not described in detail.

Usually in existing technology, during the process of cleaning a predefined area, the movement path of a cleaning robot with autonomous obstacle crossing ability can traverse the areas to be cleaned to improve the cleaning effect and avoid leaving any areas to be cleaned. In this application, the cleaning robots all have the self-moving function, which includes but is not limited to sweeping robots and cleaners. Taking the example of a sweeping robot, for example, the sweeping robot will use a bow shaped cleaning path to clean the room. In cases where the sweeping robot encounters an obstacle, such as a step, and the height of the obstacle is less than the first predefined height, the robot will continue to follow the pre-planned route; the height that the sweeping robot can cross in normal operation is typically between 0 centimeter to 3 centimeters. When the height of the obstacle falls between the first predefined height and the second predefined height, controlling the sweeping robot to follow the pre-planned route and activating the obstacle crossing mode when the robot approaches a position where the distance to the obstacle is less than the predefined distance, thereby the robot can cross the obstacle; specifically, activating obstacle crossing mode can refer to: activating the rocker arm device in the sweeping robot so that the rocker arm device is able to start rotation. Specifically, the rocker arm device is connected to a motor, activating the rocker arm device in the sweeping robot can refer to: activating the motor connected to the rocker arm device, so that the motor connected to the rocker arm device is able to drive the rocker arm device to rotate, however in the case of the rocker arm device rotating, the rocker arm device is able to drive the sweeping robot to cross over obstacles with heights between the first predefined height and the second predefined height. The second predefined height can refer to the maximum height that can be crossed by the robot when activating the obstacle crossing strategy. Although the cleaning robots above are equipped with active obstacle crossing mechanisms, the height and posture of the robot can be changed by controlling the changes in the active obstacle crossing mechanism, thereby improving the obstacle crossing ability, but typically, robots with active obstacle crossing ability only rely on judging the height of obstacles to decide whether or not to cross them. However, such a judgment method does not take into account the complexity of the environment, and is easy to lead to excessive unnecessary active obstacle crossing controls or still be unable to cross obstacles smoothly even after the active obstacle crossing function is activated, this not only wastes the energy of the cleaning robot, but also causes damage to the active obstacle crossing mechanism. This embodiment provides a more optimized control method to improve the efficiency and lifespan of cleaning robots.

The method embodiments provided in this application can be executed in a computer terminal or similar computing device. Taking a computer terminal as an example, FIG. 1 is a hardware architecture diagram of the computer terminal for the active obstacle crossing control method for cleaning robot in an embodiment of the present application. As shown in FIG. 1, the computer terminal may include one or more (only one is shown in FIG. 1) processors 102 (the processor 102 may include but be not limited to a processing device such as a microprocessor unit (MPU for short) or programmable logic device (PLD for short)) and memorys 104 for storing data, optionally, the above computer terminal may also include transmission devices 106 for communication and input output devices 108. Those skilled in the art can understand that the structure shown in FIG. 1 is only for illustration and does not limit the structure of the computer terminal mentioned above. For example, the computer terminal may also include additional or fewer components than those shown in FIG. 1, or it may have different configurations with equivalent or more functionalities compared to the components shown in FIG. 1.

The memorys 104 are configured to store a program, such as software programs and modules for applications, including the computer program corresponding to the obstacle crossing method in the embodiment of the present invention, the processor 102 executes various functional applications and data processing by running the computer program stored in memory 104, thereby implementing the above-mentioned method. Memorys 104 may include high-speed random access memory and may also include non-volatile memory, such as one or more magnetic storage devices, flash memory, or other non-volatile solid-state memory. In some embodiments, memorys 104 may further include memorys remotely set relative to processors 102, these remote memorys can be connected to the computer terminal through a network. The above network examples include but are not limited to the Internet, enterprise intranet, local area network, mobile communication network and their combinations.

The transmission device 106 is configured to receive or send data over the network. The above network examples include wireless networks provided by communication providers of computer terminals. In an embodiment, the transmission device 106 includes a network interface controller (NIC for short), the network interface controller can be connected to other network devices through the base station to communicate with the Internet. In an embodiment, the transmission device 106 can be a radio frequency (RF for short) module, which is configured to communicate with the Internet through wireless means.

Embodiment One

The embodiment comprises a cleaning robot, which comprises an active obstacle crossing mechanism, an obstacle crossing driving device for driving the motion of the active obstacle crossing mechanism, a memory and a processor, a program is stored in the memory, the processor is configured to control the driving device to drive the motion of the active obstacle crossing mechanism by executing the control method through the computer program. The active obstacle crossing mechanism is a connecting rod mechanism, a cam mechanism, a piston lifting mechanism, or any other mechanism capable of locally or globally lifting the cleaning robot to induce pose changes, thereby improving its obstacle crossing ability, the obstacle crossing driving device is a motor system used for the motion of the active obstacle crossing mechanism. By activating the active obstacle crossing function, the obstacle crossing ability of the cleaning robot is improved by a certain height compared to not activating the active obstacle crossing function, in this embodiment, the improved height is 1 cm to 2 cm preferably, in the case of without activating the sweeping robot, if the maximum obstacle crossing height of the robot is 3 cm, then the maximum obstacle crossing height after activating can reach 4 cm to 5 cm. Preferably, the active obstacle crossing mechanism and driving wheels are sequentially set before and after in the movement direction of the cleaning robot, the minimum distance between the contact point of the active obstacle crossing mechanism to the ground during the active obstacle crossing and the contact point of the driving wheels to the ground is 3 cm to 5 cm, thus, a support point is formed during obstacle crossing and the contact point between the driving wheel and the ground is used as a fulcrum to lift the cleaning robot in a lever manner, causing the front of the cleaning robot to tilt up, this method can better control the lifting distance and make the lifting more stable, allowing the front of the cleaning robot to tilt up and smoothly cross obstacles that could not have been crossed before.

Figure 2:
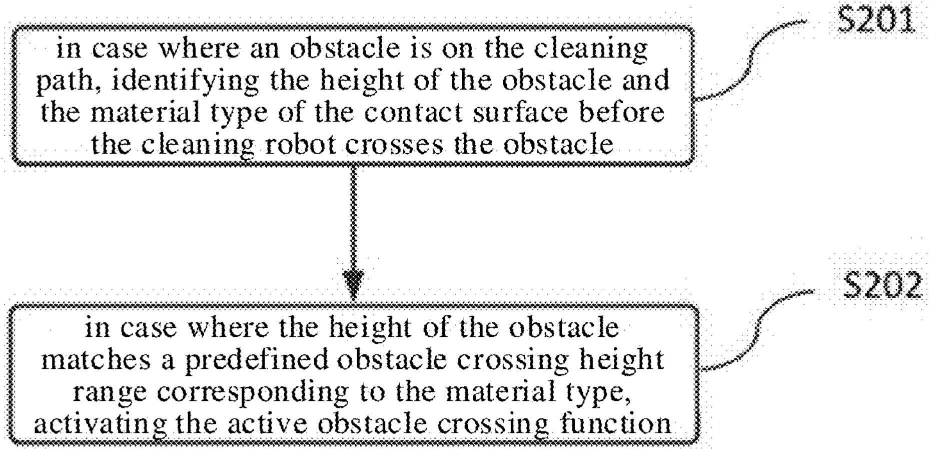
FIG. 2 is a flowchart of the control method provided by an embodiment of the present application.

This embodiment specifically provides an active obstacle crossing control method for cleaning robot, the cleaning robot comprises an active obstacle crossing mechanism and an obstacle crossing driving device for driving the motion of the active obstacle crossing mechanism, as shown in FIG. 2, the active obstacle crossing control method comprises the following control processes:

S201: in case where an obstacle is on the cleaning path, identifying the height of the obstacle and the material type of the contact surface before the cleaning robot crosses the obstacle;

The height of the obstacle can be obtained through laser radar sensors, laser radar sensors can be installed on the sweeper, and a three-dimensional point cloud map of the surrounding environment can be obtained through laser scanning, which helps to calculate the height information of obstacles ahead and achieve obstacle height detection. This solution has the advantages of high precision and high resolution; visual sensors can also be used to detect the height of obstacles in the sweeper. The specific implementation method is installing a camera on the sweeper and using image recognition algorithms to identify the height of obstacles ahead. By using image processing technology, the height of obstacles is converted into distance, and obstacles are detected based on a set height threshold. This solution can achieve fast and accurate obstacle detection. In addition, ultrasonic sensors can also be used to detect the height of obstacles, ultrasonic sensors are installed in the front of the sweeper to measure the distance between obstacles in front and the sweeper by emitting and receiving ultrasonic waves, thereby detecting the height of obstacles. This solution has the advantages of low cost, high reliability, and fast response speed.

In this embodiment, the image features of the image are detected through image sensors, and the material type of the working surface is identified by determining whether the image features meet the feature threshold. Specifically, the determination can be made based on the brightness data and feature point data of the images captured under the illumination of LED lights with different input current intensities, which are collected in advance for working surfaces of different material types. In addition to the image brightness and feature points provided above, the material type of the working surface corresponding to the image can also be identified from other feature perspectives, such as color features, texture features, and other image features. The specific implementation can refer to the implementation of image brightness and feature points provided in this embodiment.

S202: in case where the height of the obstacle matches a predefined obstacle crossing height range corresponding to the material type, activating the active obstacle crossing function.

According to this patent, the material type can reflect the friction force between the wheel and the ground material, the sweeper can adaptively detect the material type of the ground and take different actions based on its friction level. Specifically, the sweeper can detect the material type of the ground through sensors (such as wood, carpet, ceramic tiles, marble, rubber roll, and epoxy resin). Then, the sweeper can choose the appropriate obstacle crossing height range and forward method based on the material of the contact surface. In an example, for surfaces with weaker friction, the sweeper can choose to move forward at a slower or more stable speed, while for surfaces with stronger friction, a faster or more flexible way of moving forward can be chosen. In addition, when the sweeper encounters obstacles, it can comprehensively determine whether to activate active obstacle crossing based on factors such as the height, type, and slope of the obstacles, combined with the friction level. In summary, the sweeper can take different actions based on the material type of the ground and the corresponding obstacle crossing range, in order to better adapt to different ground environments. According to this embodiment, the obstacle information primarily focuses on the height of the obstacles. In typical common household cleaning scenarios, obstacles often include steps, thresholds, or other objects with vertical sides. The obstacle crossing function of a cleaning robot is primarily used for crossing steps and thresholds. The corresponding obstacles mainly have vertical sides. As shown in the contact diagram between the wheel of the cleaning robot and obstacles in FIG. 3, when the wheel 1 of the sweeper encounters a step 2, there will be a contact point where the height of the step and the diameter of the wheel determine the angle and position of the contact. At this moment, when the active obstacle crossing is not activated, the wheel 1 makes contact with the step 2. The step 2 exerts a compressive force F1 on the wheel, and when the vertical component of F1 balances the weight of the sweeper, if the friction force f provided by the ground matches the horizontal component of F1, the wheel 1 can smoothly cross over the step 2. If the friction force f is not sufficient to match the horizontal component of F1, the passive obstacle crossing cannot be completed. In this case, the active obstacle crossing mode needs to be activated to provide assistance, in an example, this can be achieved by adjusting the height or tilt angle of the sweeping robot, or by using linkages, hydraulic rods, or similar mechanisms to overcome the obstacle. The friction force f depends on factors such as the material of the contact surface, the weight of the robot, and the surface parameters of the wheels, so this present disclosure is able to perform a pre-rating and estimation of the friction force provided by the contact surface to the sweeping robot based on the detected material type of the contact surface, this allows for the prediction of whether the sweeper can cross the obstacle at the current height through its own mobility abilities based on other predefined empirical parameters. If the sweeper cannot cross the obstacle, the present disclosure activates the active obstacle crossing function to minimize unnecessary active obstacle crossing control, prevent wastage of the sweeper's energy, and reduce damage to the active obstacle crossing mechanism.

In this embodiment, the classification of material types of the contact surface before the cleaning robot crossing obstacles can correspond to different height ranges activating the active obstacle crossing function. Specifically, the types of contact surfaces to be recognized can be divided into carpets, wood, ceramic tiles, marble, rubber roll, epoxy resin, and other common indoor materials. Due to the differences in material types, the friction force ranges provided by the contact surfaces will also vary. Therefore, different ranges for activating the active obstacle crossing function can be selected based on the different material types. Taking wood as an example of the material type, in this embodiment, wood corresponds to a predefined obstacle height range of 3 cm to 5 cm. This means that the lower limit for activating the active obstacle crossing function is 3 cm, and the upper limit is 5 cm. Therefore, when there is an obstacle on the cleaning path with a recognized height between 3 cm and 5 cm, the active obstacle crossing function will be activated, which can control the cleaning robot to cross the obstacle by adjusting its height or position. When an obstacle with a height lower than 3 cm is detected, the cleaning robot will simply pass through it. However, when an obstacle with a height higher than 5 cm is detected, the active obstacle crossing function will not be activated. Instead, the cleaning robot will be controlled to bypass the obstacle. In this embodiment, depending on the level of friction force provided by different material types, the predefined obstacle height range for ceramic tiles can be set between 2.5 cm and 4.5 cm, and the predefined obstacle height range for carpets can be set between 3.5 cm and 5.5 cm. The above numerical ranges are for illustration purposes only. In reality, the predefined obstacle height range corresponding to different materials can be adjusted based on factors such as the weight of the cleaning robot and the height of its wheels. The predefined obstacle height ranges can be different or the same depending on the specific requirements.

In a further optimized embodiment, the material types can be further differentiated to determine the level of friction provided. For example, wood can be categorized based on different levels of smoothness and types of trees, carpets can be categorized based on different fabric materials. This allows for a more detailed distinction and adjustment of the corresponding predefined obstacle height ranges.

In another optional embodiment, the material type reflects the sinkage of the wheel on the corresponding ground. While the cleaning robot moves, it may experience a certain degree of sinkage due to its own weight and the characteristics of the floor material. For instance, surfaces made of materials like marble or ceramic tiles may cause minor sinkage which can be disregarded. On the other hand, flexible materials such as carpets and mats can result in more significant sinkage. The specific type of carpet can also influence the extent of sinkage, for example long-pile carpets will sink deeper compared to short-pile carpets. Generally, when a sweeping robot detects obstacles ahead, it measures the height of the obstacles from the ground. However, at that moment, the ground corresponding to the obstacles has not yet experienced the sinkage caused by the cleaning robot's weight. Therefore, as shown in FIG. 5, when the obstacle is at a height H1 from the ground and the cleaning robot causes a sinking depth H2, the actual height the robot crosses is H1+H2, which is greater than the detected height H1. Therefore, when determining whether to activate active obstacle crossing, the cleaning robot may mistakenly classify a height that it cannot cross as passable. This can ultimately result in the robot's inability to cross the obstacle, reducing cleaning efficiency and increasing wear on the transmission mechanism. The sinking depth primarily depends on the material type. Therefore, by conducting multiple tests or using other deductive calculations, it is possible to determine the sinking depth corresponding to various material types. By combining this information with the range of obstacles that the robot can cross on a non-sinking surface, a predefined obstacle crossing height for each material type can be obtained. In reality, the predefined obstacle height range corresponding to different materials can be adjusted based on factors such as the weight of the cleaning robot and the height of its wheels. The predefined obstacle height ranges can be different or the same depending on the specific requirements. The material type reflects the compression degree between the wheel and the ground material. This allows the cleaning robot to take into account the varying sinking depths caused by different ground materials before attempting active obstacle crossing. Therefore, the actual obstacle crossing height considered by the cleaning robot should be the height of the obstacle above the ground plus the sinking depth of the robot. This approach allows for more precise determination of the actual obstacle crossing height, and controlling the robot to choose whether to activate active obstacle crossing or to avoid the obstacle based on the actual situation. In the above embodiments, the material type reflects the friction force between the wheels and the ground material and reflects the sinking depth of the wheels on the corresponding surface. These two scenarios can be considered separately to map the predefined obstacle crossing height, or they can be integrated to determine the predefined obstacle crossing height.

In one feasible solution, the material type of the contact surface is obtained through real-time detection by the cleaning robot during operation. Some cleaning robots formulate cleaning strategies by detecting the material type of the floor in real-time. For example, the detected material types of the cleaning surface may include hard materials such as wooden floors and tiles, as well as soft materials such as carpets. When compared to soft materials, hard materials are easier to clean at the same level of dirtiness, so the proportion of cleaning solution can be set to be less for hard materials and more for soft materials. The logic for adding cleaning solution is as follows: when the material type is hard and the dirtiness level is slight, the proportion of cleaning solution added is set to half of the standard proportion; when the material type is hard and the dirtiness level is moderate, the proportion of cleaning solution added is set to the standard proportion; when the material type is hard and the dirtiness level is heavy, the proportion of cleaning solution added is set to twice the standard proportion; when the material type is soft and the dirtiness level is slight, the proportion of cleaning solution added is set to the standard proportion; when the material type is soft and the dirtiness level is moderate, the proportion of cleaning solution added is set to twice the standard proportion; when the material type is soft and the dirtiness level is heavy, the proportion of cleaning solution added is set to multiple times the standard proportion. Therefore, it is possible to utilize sweeping robots equipped with the capability of ground material identification to obtain the material type of the floor. The present disclosure obtains the material type of the contact surface corresponding to the wheels during the cleaning robot's obstacle crossing process by real-time detection of the ground material in case where an obstacle is on the cleaning path. Thereby this enables the efficient obstacle crossing effect, and can save costs and effectively share data by combining the existing functionalities with the control logic of the present disclosure. This approach has outstanding practical features and significant improvement.

In another feasible solution, the material type is obtained through activating the contact surface material detection function and detecting the corresponding contact surface when crossing the obstacle by the cleaning robot in case where an obstacle is on the cleaning path. When the sweeping robot encounters obstacles in the cleaning path, it activates the contact surface material detection function. The robot can obtain the material type through detecting the corresponding contact surface when crossing the obstacle, when there is no contact during normal operation, the material detection function is not activated. Therefore, the sweeping robot will automatically recognize the obstacles and activate the material detection function to distinguish different material types when encounters obstacles. This approach helps to improve the cleaning efficiency and effectiveness of the sweeping robot, saving energy compared to real-time detection, and enabling them to better cope with cleaning tasks in various complex environments.

In this embodiment, the present application can also be a system, method, and/or computer program product. The computer program product may include a computer-readable storage medium having computer-readable program instructions for causing a processor to implement various aspects of the present application.

Wherein, as shown in FIG. 4, the control system 400 for the cleaning robot with active obstacle crossing function comprises an identification module 401 and a control module 402. The identification module 401 is configured to identify the height of the obstacle and the material type of the contact surface before the cleaning robot crosses the obstacle in case where an obstacle is on the cleaning path; the control module is configured to activate the active obstacle crossing function in case where the height of the obstacles matches a predefined obstacle crossing height range corresponding to the material type.

Embodiment Two

In this embodiment, an active obstacle crossing control method for cleaning robot is provided, the cleaning robot is equipped with a binocular camera, the control method comprises the following steps:

in case where an obstacle is on the cleaning path, adjusting the relative position of the binocular camera and the obstacle to identify the obstacle information and the material type of the contact surface before the cleaning robot crosses the obstacle;

when the obstacle information matches the predefined obstacle crossing height range corresponding to the material type, activating the active obstacle crossing function.

Although the height of the obstacle can be obtained through laser radar sensors, laser radar sensors can be installed on the sweeper, and a three-dimensional point cloud map of the surrounding environment can be obtained through laser scanning, which helps to calculate the height information of obstacles ahead and achieve obstacle height detection. However, when the cleaning robot encounters complex obstacles, the obstacle crossing process involves a more intricate contact force relationship with the obstacles. This relationship depends on factors such as the height, width, tilt angle, and material of the obstacles. To determine whether to activate active obstacle crossing, more precise information needs to be obtained.

According to the principle of binocular camera disparity, the detection distance range of the binocular camera should be between 1 to 10 times the distance between the cameras. The detection distance of a binocular camera is also influenced by various factors such as environmental lighting, the size of the target object, its color, surface texture, and so on. Therefore, it is necessary to obtain obstacle information more accurately by capturing a more precise angle within the effective distance. The combination of laser radar and binocular camera of the cleaning robot enables more precise distance measurement. The method involves using a laser radar to identify and reconstruct light points through the binocular camera, enabling the calculation of the distance and corresponding angle between the target object and the camera. This allows the cleaning robot to adjust its angle and distance when encountering obstacles. This adjustment is achieved by modifying the relative position of the binocular camera and the obstacle, including driving the cleaning robot to align the binocular camera with the obstacle. The binocular camera is positioned at a minimum distance greater than the predefined recognition distance from the obstacle to identify obstacle information and gather information about the obstacle prior to the cleaning robot's obstacle crossing. The obstacle information includes at least the height of the obstacle. The obstacle information further comprises one or more of the width of the obstacle, the obstacle crossing slope, or the type of the obstacle. By utilizing a binocular sensor in conjunction with active obstacle crossing, it is possible to identify the current obstacle crossing scene with greater accuracy. Specifically, the binocular sensor first captures a three-dimensional point cloud of the scene. The obtained point cloud is dense three-dimensional point cloud, meaning it contains depth information for all feature points in the environmental image. Further processing is required to extract the three-dimensional point cloud specifically for obstacles from the dense three-dimensional point cloud. First, a three-dimensional point cloud within the predefined height range is extracted from the scene point cloud. However, since the extracted point cloud within the predefined height range still contains points outside the obstacle feature, it is necessary to extract the obstacle three-dimensional point cloud based on the pixel range of the obstacle from the three-dimensional point cloud within the predefined height range. This further reduces unnecessary point cloud data and improves the calculation speed and prediction accuracy in subsequent steps. Finally, the two-dimensional local contour is obtained based on the obstacle three-dimensional point cloud. After obtaining the two-dimensional point cloud of the obstacle, at this stage, the two-dimensional point cloud of the obstacle appears as a scattered point cloud from a top perspective, which roughly represents the top contour of the obstacle. Next, the two-dimensional point cloud of the obstacle is fitted to the two-dimensional local contour of the obstacle from a top perspective. Here, the scattered two-dimensional point cloud is transformed into lines, such as straight lines or curves, to represent the two-dimensional local contour of the obstacle.

Based on the detailed identification of the final recognized obstacles, combined with the detection of the material type of the contact surface in this application, a relative mapping relationship is formed. This method is able to perform a pre-rating and estimation of the friction force f provided by the contact surface to the sweeping robot, this allows for the prediction of whether the sweeper can cross the obstacle at the current height through its own mobility abilities based on other predefined empirical parameters or mapping relationships. If the sweeper cannot cross the obstacle, the present disclosure activates the active obstacle crossing function to minimize unnecessary active obstacle crossing control, prevent wastage of the sweeper's energy, and reduce damage to the active obstacle crossing mechanism.

In this embodiment, the present application can also be a system, method, and/or computer program product. The computer program product may include a computer-readable storage medium having computer-readable program instructions for causing a processor to implement various aspects of the present application.

Wherein, the cleaning robot with active obstacle crossing function is equipped with a binocular camera, the control system for the cleaning robot comprises an adjustment module, the adjustment module is configured to adjust the relative position of the binocular camera and the obstacle to identify the obstacle information and the material type of the contact surface before the cleaning robot crosses the obstacle in case where an obstacle is on the cleaning path;

a control module, the control module is configured to activate the active obstacle crossing function in case where the height of the obstacles matches a predefined obstacle crossing height range corresponding to the material type.

The embodiment comprises a cleaning robot, which comprises an active obstacle crossing mechanism, an obstacle crossing driving device for driving the motion of the active obstacle crossing mechanism, a memory and a processor, a program is stored in the memory, the processor is configured to control the driving device to drive the motion of the active obstacle crossing mechanism by executing the control method through the computer program. The active obstacle crossing mechanism is a connecting rod mechanism, a cam mechanism, a piston lifting mechanism, or any other mechanism capable of locally or globally lifting the cleaning robot to induce pose changes, thereby improving its obstacle crossing ability, the obstacle crossing driving device is a motor system used for the motion of the active obstacle crossing mechanism. The specific driving process is the same as in the first embodiment and will not be described again here.

The computer-readable storage medium mentioned above can be a tangible device capable of retaining and storing instructions utilized by the instruction-executing apparatus. The computer-readable storage medium, for example but not limited to, can be an electronic storage device, a magnetic storage device, an optical storage device, an electromagnetic storage device, a semiconductor storage device, or any suitable combination thereof. More specific examples (non-exhaustive list) of computer-readable storage media include portable computer disks, hard drives, random access memory (RAM), read-only memory (ROM), erasable programmable read-only memory (EPROM or flash memory), static random access memory (SRAM), portable compressed disk read-only memory (CD-ROM), digital versatile disk (DVD), memory sticks, floppy disks, mechanical coding devices, such as instruction-bearing punched cards or raised structures in a groove, and any suitable combination thereof. The computer-readable storage medium used here is not interpreted as the instantaneous signal itself, such as radio waves or other freely propagating electromagnetic waves, electromagnetic waves propagated through waveguides or other transmission media (e.g. optical pulses through optical fiber cables), or electric signals transmitted through wires.

The computer-readable program instructions described here can be downloaded from the computer-readable storage medium to various computing/processing devices, or downloaded to external computers or external storage devices via a network, such as the Internet, a local area network, a wide area network, and/or a wireless network. The network can include copper transmission cables, fiber optic transmission, wireless transmission, routers, firewalls, switches, gateway computers, and/or edge servers. The network adapter or network interface in each computing/processing device receives computer-readable program instructions from the network and forwards the computer-readable program instructions to be stored in the computer-readable storage medium in each computing/processing device.

The computer program instructions used to perform the operations of this application can be assembly instructions, instruction set architecture (ISA) instructions, machine instructions, machine-specific instructions, microcode, firmware instructions, status-setting data, or source code or object code written in one or more programming languages in any combination. The programming languages include object-oriented programming languages such as Smalltalk, C++, as well as conventional procedural programming languages such as "C" language or similar programming languages. The computer-readable program instructions can be executed entirely on the user's computer, partially on the user's computer, executed as a standalone software package, partially executed on the user's computer and partially on a remote computer, or executed entirely on a remote computer or server. In scenarios involving remote computers, the remote computer can be connected to the user's computer through any type of network, including a local area network (LAN) or wide area network (WAN), or it can be connected to an external computer (such as via an internet service provider for internet connectivity). In some implementations, the electronic circuit can be individually customized by utilizing the state information of computer-readable program instructions. the electronic circuits can include programmable logic circuits, field-programmable gate array (FPGA), or programmable logic array (PLA). These electronic circuits are capable of executing computer-readable program instructions to implement various aspects of the present application.

Here, various aspects of the present application are described with reference to the flowchart and/or block diagram of methods, apparatus (systems), and computer program products according to embodiments of the present application. It should be understood that each block of the flowchart and/or block diagram, as well as combinations of blocks in the flowchart and/or block diagram, can be implemented by computer-readable program instructions.

These computer-readable program instructions can be provided to a processor of a general-purpose computer, a dedicated computer, or another programmable data processing apparatus to produce a machine that performs the functionality/actions specified in one or more blocks of the flowchart and/or block diagram when the instructions are executed by the processor of the computer or other programmable data processing apparatus. Alternatively, these computer-readable program instructions can be stored in a computer-readable storage medium such that the instructions cause a computer, a programmable data processing apparatus, and/or other devices to operate in a particular manner. Thus, the computer-readable storage medium containing the instructions is a tangible article of manufacture that includes instructions for implementing various aspects of the functionality/actions specified in one or more blocks of the flowchart and/or block diagram.

The computer-readable program instructions can also be loaded onto a computer, other programmable data processing apparatus, or other devices to perform a series of operational steps that generate a computer-implemented process. Thus, the instructions executed on a computer, other programmable data processing apparatus, or other devices implement the functionality/actions specified in one or more blocks of the flowchart and/or block diagram.

The flowchart and block diagram provided illustrate the possible system architecture, functions, and operations of the systems, methods, and computer program products according to various embodiments disclosed in this application. At this point, each block in the flowchart or block diagram can represent a module, program segment, or portion of instructions where the module, program segment, or portion of instructions includes one or more executable instructions for implementing the specified logical functions. In some alternative implementations, the functions labeled in the blocks can occur in a different order than indicated in the diagrams. For example, two consecutive blocks can actually be executed in a substantially parallel manner, and at times, they can be executed in reverse order depending on the functionality involved. It should also be noted that each block in the block diagram and/or flowchart, as well as the combination of blocks in the block diagram and/or flowchart, can be implemented using dedicated hardware-based systems that perform the specified functions or actions. Alternatively, they can be implemented using a combination of dedicated hardware and computer instructions.

The above descriptions have provided various embodiments of the present application. The preceding explanations are exemplary and not exhaustive, and they are not limited to the disclosed embodiments. Many modifications and variations will be apparent to those skilled in the art in view of the embodiments described herein, without departing from the scope and spirit of the disclosed various embodiments. The selection of terms used in this document is intended to best explain the principles, practical applications, or technological advancements in the market, or to enable other ordinary skilled technicians in the art to understand the disclosed embodiments described in this document.

The invention claimed is:

1. An active obstacle crossing control method for a cleaning robot, wherein the method comprises steps of:

in case where an obstacle is on a cleaning path of the cleaning robot, identifying a height of the obstacle and a material type of a contact surface before the cleaning robot crosses the obstacle; and in case where the height of the obstacle matches a predefined obstacle crossing height range corresponding to the material type, activating an active obstacle crossing function.

2. The method according to claim 1, wherein the material type is obtained through real-time detection by the cleaning robot during operation.

3. The method according to claim 1, wherein the material type is obtained by the cleaning robot activating a contact surface material detection function and detecting the corresponding contact surface during crossing the obstacle in case where the obstacle is on the cleaning path.

4. The method according to claim 1, wherein the material type comprises one or more of carpet, wood, ceramic tiles, marble, rubber roll, or epoxy resin.

5. The method according to claim 1, wherein the material type reflects a friction force between a wheel of the cleaning robot and a ground material.

6. The method according to claim 1, wherein the material type reflects the sinkage of the wheel on the corresponding ground.

7. The method according to claim 1, wherein a predefined obstacle crossing height corresponding to the material type comprises a pre-stored mapping relationship.

8. The method according to claim 7, wherein the predefined obstacle crossing height range comprises a minimum height and a maximum height, in case where the height of the obstacle is higher than the minimum height but lower than the maximum height, activating the active obstacle crossing function.

9. The method according to claim 1, wherein:

the active obstacle crossing function is not activated in case where the height of the obstacle does not match the predefined obstacle crossing height range corresponding to the material type.

10. A control system for a cleaning robot, wherein the control system comprises a processor, the processor is configured to identify a height of an obstacle and a material type of a contact surface before the cleaning robot crosses the obstacle in case where the obstacle is on a cleaning path of the cleaning robot; and the processor is further configured to activate an active obstacle crossing function in case where the height of the obstacle matches a predefined obstacle crossing height range corresponding to the material type.

11. A control method for a cleaning robot, wherein the cleaning robot is provided with a binocular camera, wherein the control method comprises:

in case where an obstacle is on a cleaning path of the cleaning robot, adjusting a relative position of the binocular camera and the obstacle to identify an obstacle information and a material type of a contact surface before the cleaning robot crosses the obstacle;

in case where the obstacle information matches a predefined obstacle crossing height range corresponding to the material type, activating an active obstacle crossing function.

12. The method according to claim 11, wherein adjusting the relative position of the binocular camera and the obstacle comprises driving the cleaning robot so that the binocular camera faces the obstacle and a minimum distance between the binocular camera and the obstacle is greater than a predefined identification distance.

13. The method according to claim 11, wherein the obstacle information at least comprises a height information of the obstacle.

14. The method according to claim 13, wherein the obstacle information further comprises one or more of a width of the obstacle, an obstacle crossing slope, or a type of the obstacle.

15. A control system for a cleaning robot, wherein the cleaning robot is equipped with a binocular camera, wherein the control system comprises a processor, the processor is configured to adjust a relative position of the binocular camera and an obstacle to identify an obstacle information and a material type of a contact surface before the cleaning robot crosses the obstacle in case where the obstacle is on a cleaning path of the cleaning robot; and the processor is further configured to activate an active obstacle crossing function in case where a height of the obstacles matches a predefined obstacle crossing height range corresponding to the material type.

16. A non-transitory computer-readable storage medium, wherein a program is stored in the non-transitory computer-readable storage medium, when the program is executed by a processor, the processor is configured to implement the control method according to claim 1.

17. A cleaning robot, comprising a memory and a processor, wherein a program is stored in the memory, and the processor is configured to execute the control method according to claim 1.

* * * * *